United States Patent [19]

Johnson et al.

[11] 4,376,972
[45] Mar. 15, 1983

[54] SEQUENTIAL WORD ALIGNED ADDRESS APPARATUS

[75] Inventors: Robert B. Johnson, Billerica; Chester M. Nibby, Jr., Peabody; Dana W. Moore, Dover, all of Mass.

[73] Assignee: Honeywell Information Systems Inc., Waltham, Mass.

[21] Appl. No.: 110,521

[22] Filed: Jan. 8, 1980

[51] Int. Cl.³ .............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,440,615 | 4/1969 | Carter | 364/200 |
| 3,812,473 | 5/1974 | Tucker | 364/200 |
| 4,000,485 | 12/1976 | Barlow et al. | 364/200 |

*Primary Examiner*—Raulfe B. Zache
*Attorney, Agent, or Firm*—Faith F. Driscoll; Nicholas Prasinos

[57] ABSTRACT

A memory subsystem which couples to a multiword bus for processing memory requests received therefrom includes at least a pair of independently addressable dynamic memory module units. Each memory unit includes a number of rows of random access memory (RAM) chips. The subsystem further includes an adder circuit, a pair of tri-state operated address register circuits and timing circuits. The address circuits include a pair of tri-state operated address registers which couple to the bus and to the set of address lines to each memory unit. In response to a memory request, the registers store row and column address portions of a chip address of the memory request. A multibit adder circuit is connected to increment by one the low order row address when the least significant address bits of the memory request indicate a subboundary address condition thereby enabling access to a pair of sequential word locations. Whenever a memory request specifies an address which cannot access a double word, boundary circuits upon detecting the condition cause the timing circuits to generate only timing signals necessary for accessing the first word location.

41 Claims, 9 Drawing Figures

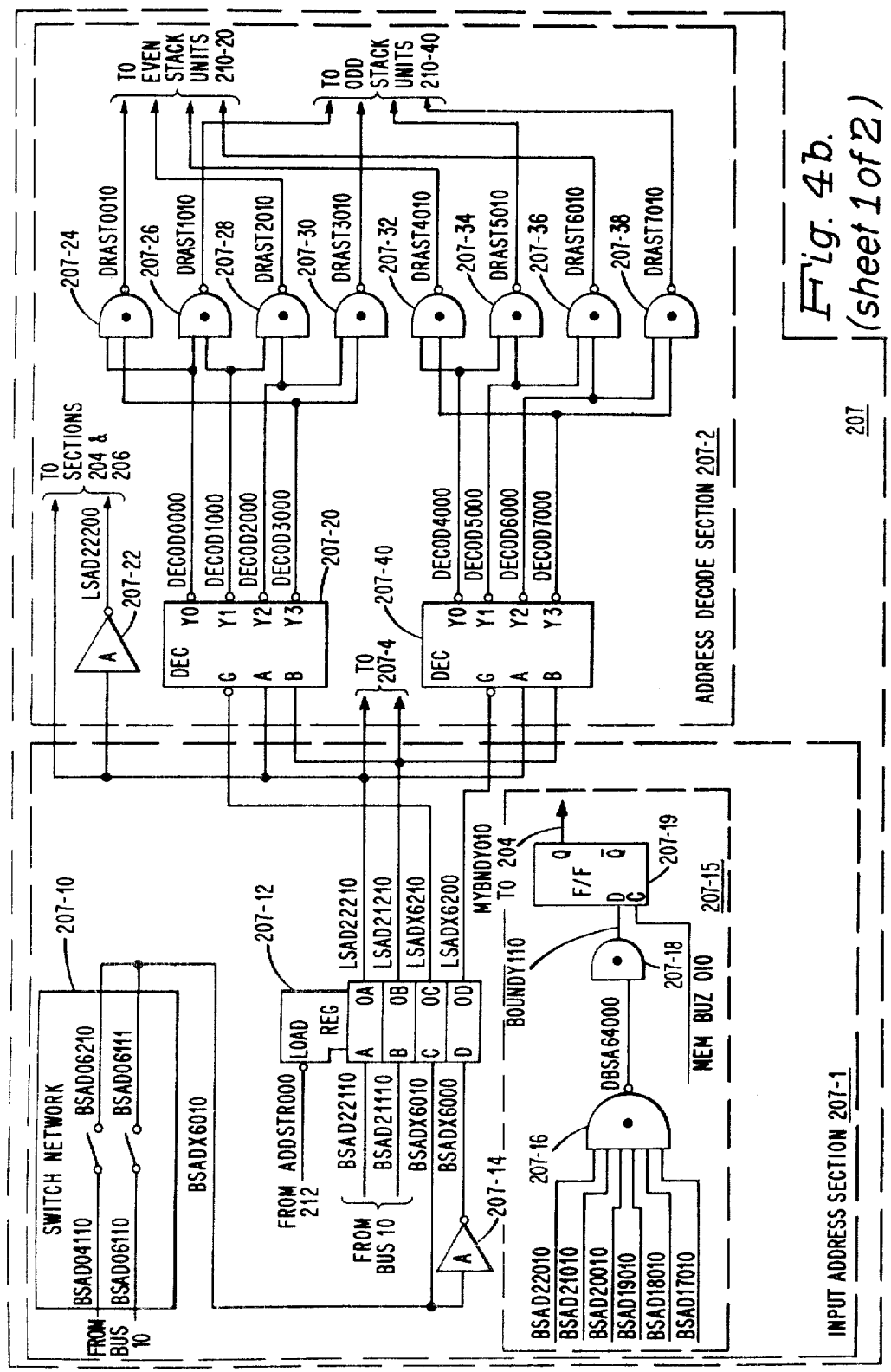

SEQUENTIAL WORD ALIGNED ADDRESS APPARATUS

RELATED APPLICATIONS

1. "Sequential Chip Select Decode Apparatus and Method" invented by Robert B. Johnson, Chester M. Nibby, Jr. and Dana W. Moore, Ser. No. 110,523, filed on Jan. 8, 1980 and assigned to the same assignee as named herein.
2. "Low Cost Double Word Fetch System" invented by Robert B. Johnson, Chester M. Nibby, Jr. and Dana W. Moore, Ser. No. 110,522, filed on Jan. 8, 1980 and assigned to the same assignee as named herein.
3. "Multimode Memory System" invented by Robert B. Johnson and Chester M. Nibby, Jr., Ser. No. 110,520, filed on Jan. 8, 1980 and assigned to the same assignee as named herein.

BACKGROUND OF THE INVENTION

1. Field of Use

This invention relates to memory systems containing semiconductor memory elements including those in which stored information must be periodically refreshed to preserve the integrity of such information.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in the copending patent application "System Providing Multiple Fetch Bus Cycle Operation", invented by John L. Curley, Robert B. Johnson, Richard A. Lemay and Chester M. Nibby, Jr., Ser. No. 867,270, filed on Jan. 5, 1978, now U.S. Pat. No. 4,236,203, issued Nov. 25, 1980 and assigned to the same assignee as named herein.

In the above prior art system, the memory system connects to an asynchronously operated single word wide bus. In the arrangement, a request for multiple words is made in a single bus cycle and the requested information words are delivered to the bus over a series of response cycles. While this arrangement improves the system throughput capabilities, it becomes desirable to be able to provide access to both words simultaneously over a single bus.

It will be noted that in such paired memory module systems, is is necessary to generate even and odd addresses for accessing both memory modules. An address arrangement for accomplishing the generation is described in copending patent application "A Dynamic Memory System which Includes Apparatus for Performing Refresh Operations in Parallel with Normal Memory Operations", invented by Robert B. Johnson and Chester M. Nibby, Jr., Ser. No. 926,480, filed on July 20, 1978, now U.S. Pat. No. 4,185,323, issued on Jan. 22, 1980 and assigned to the same assignee as named herein.

In the above arrangement, the low order bits of the address provided with the memory request specify the storage location being accessed while the high order bits specify which row of RAM chips is being selected. In order to fetch the second word of the pair being accessed, it is necessary to increment by one the memory request address and then decode the incremented address. This required that the memory address arrangement include a primary address register which also served as a counter and two parallel secondary address registers for storing the initial and incremented addresses received from the primary address register. This arrangement enables the processing of memory requests which start on any word boundary (i.e., allows access to an even or odd word). In addition to the amount of address register storage, the arrangement increases the delay in generating odd and even addresses for accessing both memory modules starting with either module.

Accordingly, it is an object of the present invention to provide a memory system which provides for the generation of addresses for the read out of a pair of words from a pair of memory modules.

It is a further object of the present invention to provide a method and apparatus which minimizes the circuitry and delay for providing the addresses for read out of at least a pair of words from a memory system which couples to a multiword bus.

SUMMARY OF THE INVENTION

The above and other objects are achieved in a preferred embodiment of the preferred embodiment of the memory subsystem of the present invention which includes at least a pair of independently addressable memory module units which operatively couple to a multiword bus through separate data register circuits. Each memory module unit includes a number of rows of random access memory (RAM) chips.

According to the present invention, the address associated with each memory request received by the memory subsystem is coded so that the least significant or low order address bits specify which row of RAM chips contains the first word location to be accessed. The next more significant or higher order address bits specify the RAM chip address of a first word location to be accessed.

The memory subsystem further includes common addressing circuits and common timing circuits. The address circuits include a multibit adder circuit and a pair of tri-state operated address registers for storing the row and column address portions of the chip address of the memory request address received from the bus. The output terminals of both registers connect in common to the sets of address lines applied to the different memory module units for address multiplexing. However, the low order address lines which coupled to the memory module unit assigned the even memory addresses are passed through the adder circuit.

In response to a memory request, the timing circuits generate a sequence of timing signals which condition the address registers to apply in succession the row and column addresses to the sets of address lines of the memory module units for accessing a plurality of sequential word locations. In the case of memory read request, a plurality of words are read out simultaneously to the data register circuits which connect through output multiplexer circuits to the sets of word lines which comprise the multiword bus. The multiplexer circuits selectively apply the plurality of words to the sets of word lines during a single bus cycle of operation in accordance with the state of the least significant address bit. That is, the even or odd word may be applied to each set of word lines as a function of the value of the least significant address bit. In a similar fashion, multiplexer circuits which connect to data register circuits and to the multiword bus enable the words received from the bus to be written into the correct memory module unit via the data register circuits during write operations.

When the least significant address bits have a predetermined value which is indicative of a subboundary address condition, the adder circuit increments by one the low order row address bits enabling access to the desired sequential pair of word locations within the memory module units. However, whenever a memory request specifies an address indicative of an actual boundary address condition, boundary circuits upon detecting the address condition the timing circuits to generate only the timing signals for accessing the first word location of the plurality.

The above arrangement is able to provide the required addresses for simultaneously accessing a plurality of sequential word locations in a plurality of memory module units during a single bus cycle of operation utilizing a minimum of register storage. This is accomplished without adversely affecting the performance of the system. That is, the preferred embodiment includes a 4-bit adder circuit which increments the chip address by one every fourth word (i.e., when the least significant bits have the value "11"). This extends the boundary condition to occur on word 63 or on a modulo 63 basis. By increasing the adder size, the boundary condition can be further extended.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

GENERAL DESCRIPTION OF SYSTEM OF FIG. 1

Figure 1:
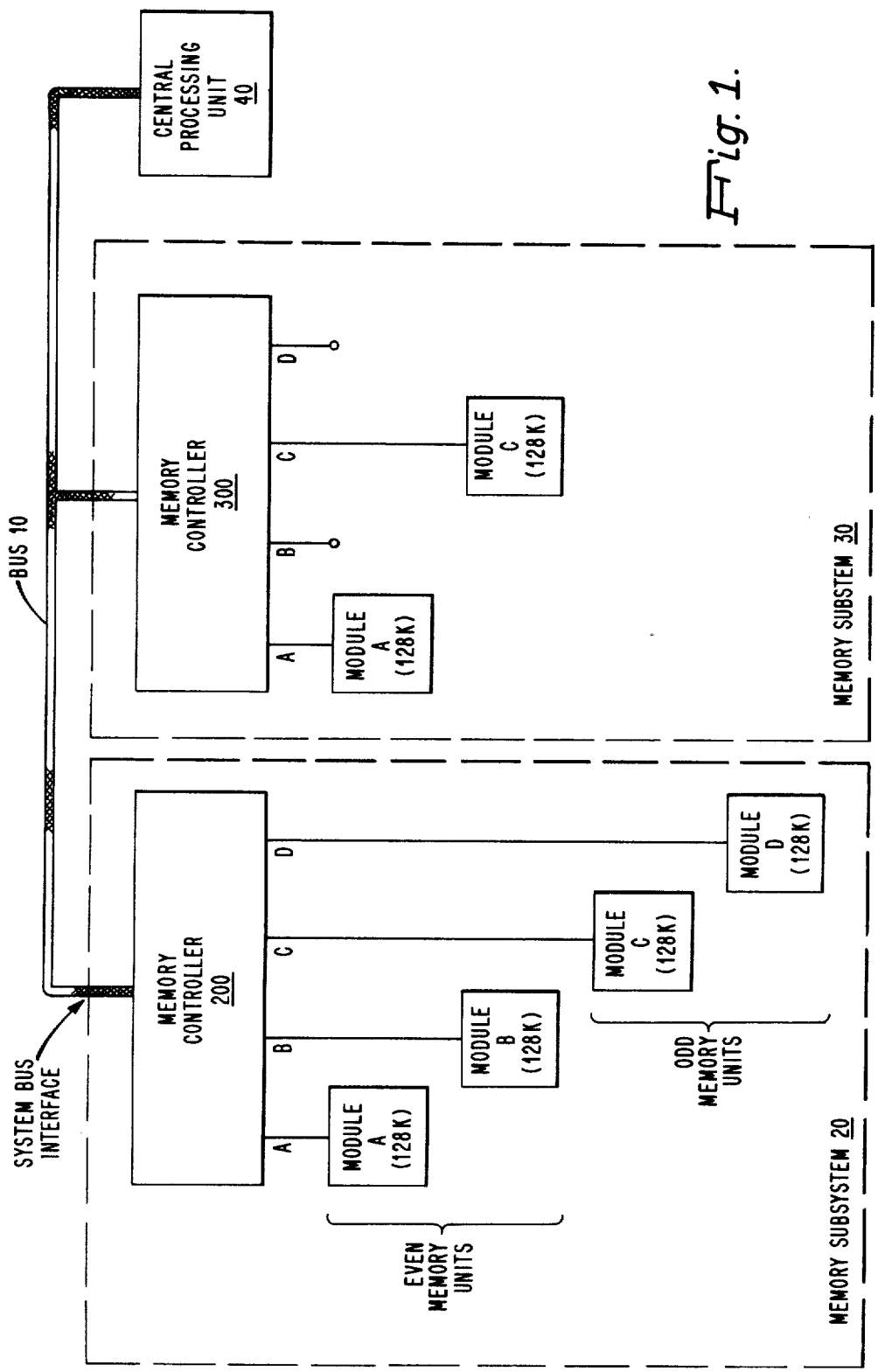
FIG. 1 shows in block diagram form a system which incorporates the principles of the present invention.

FIG. 1 illustrates a data processing system which includes the apparatus of the present invention. Referring to the figure, it is seen that the system includes a multiline bus 10 coupled to a plurality of memory subsystems 20 and 30 and to a central processing unit (CPU) 40. It will be appreciated that the system of FIG. 1 will normally include other units such as those disclosed in U.S. Pat. No. 4,000,485 issued Dec. 28, 1976. The memory subsystems 20 and 30, each include a memory controller which can address up to four memory module units. In FIG. 1, memory controller 300 is connected to address the module units labeled A and C while memory controller 200 is connected to address the module units labeled A through D.

The CPU 40 is a microprogrammed processing unit which may for the purposes of the present invention may be considered conventional in design. The copending patent application cited above in addition to the patent application "System Providing Multiple Outstanding Information Requests", invented by Richard A. Lemay and John L. Curley, Ser. No. 867,266, filed Jan. 5, 1978 and assigned to the same assignee as named herein may be consulted for further details.

The CPU 40 and memory subsystems 20 and 30 communicate over the bus 10 in a predetermined manner as set forth in U.S. Pat. No. 4,000,485. Briefly, a unit wishing to communicate requests a bus cycle and when the bus cycle is granted, the unit becomes the "master" and is able to address any other unit in the system as the "slave". In cases of those bus exchanges which require a response (e.g. memory read operation), the requesting unit as "master" identifies itself and indicates to the "slave" unit that a response is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines discussed in connection with FIG. 2, a unit is able to designate to the other unit, the type of cycle or operation being initiated or performed.

MEMORY SUBSYSTEM INTERFACE

Figure 2:
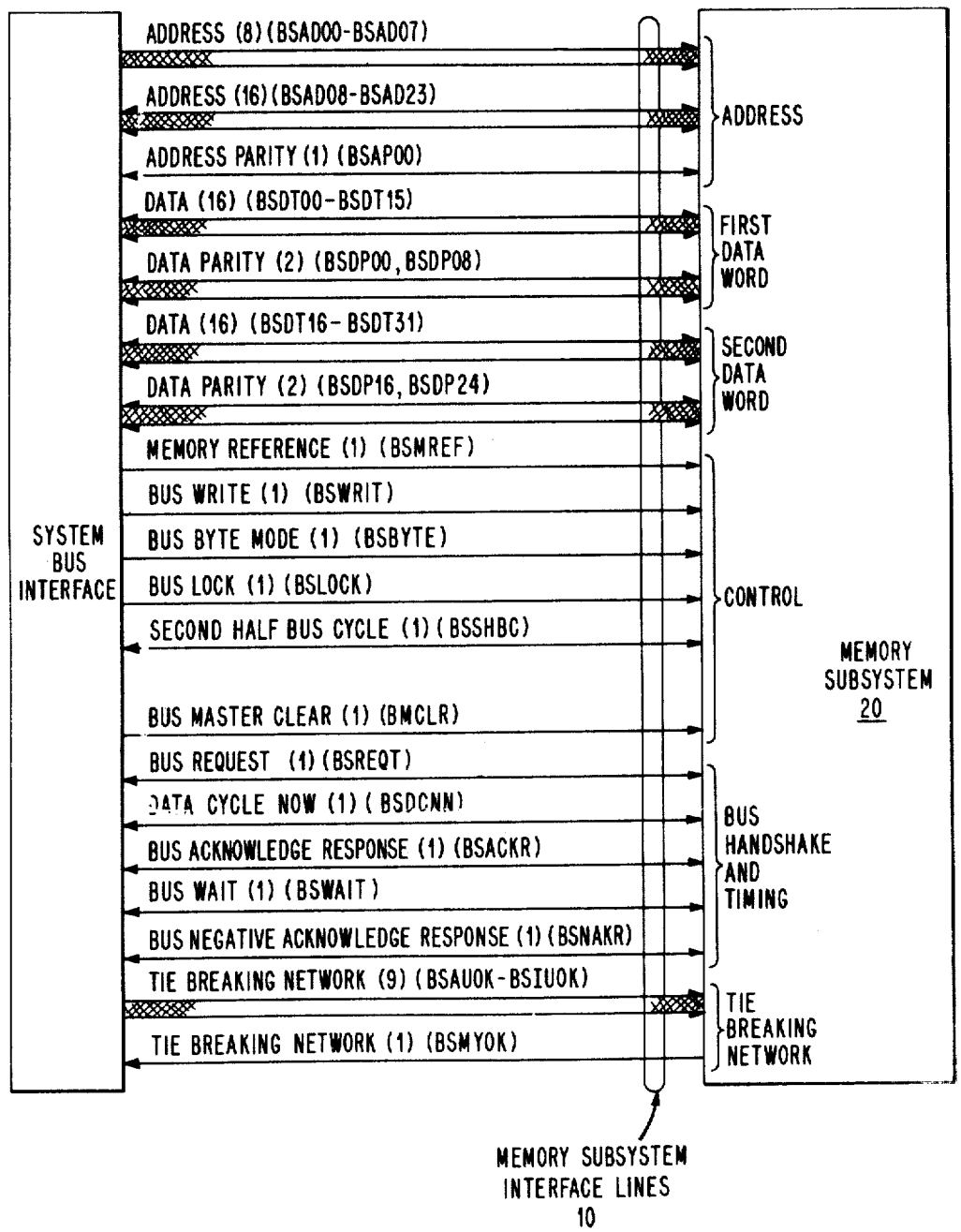
FIG. 2 shows in detail the lines of the system bus 10 which connect to the memory subsystem of FIG. 1.

FIG. 2 shows the lines which constitute the interface between each memory subsystem and bus 10. As shown, bus 10 includes a number of address lines (BSAD00-23, BSAP-00), two sets of data lines (BSDT00-15, BSDP00, BSDP08) and (BSDT16-31, BSD16, BSDP24), a number of control lines (BSMREF-BSMCLR), a number of timing lines (BSREQT-BSNAKR) and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00-BSAD23 | The bus address lines constitute a twenty-four bit wide path used in conjunction with the bus memory reference line BSMREF to transfer a 24-bit address to subsystem 20 or a 16-bit identifier from subsystem 20 to bus 10 (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23=1= right byte; BSAD23=0=left byte). When used for identification, lines BSAD00-BSAD07 are not used. The lines BSAD08-BSAD23 carry the identification of the receiving |

MEMORY SUBSYSTEM INTERFACE LINES

| Designation | Description |
|---|---|
| BSAP00 | unit as transmitted to subsystem 20 during the previous memory read request.<br>The bus address parity line is a bidirectional line which provides an odd parity signal for the address signals applied to lines BSAD00-BSAD07.<br>Data Lines |
| BSDT00-BSDT15, BSDT16-BSDT31 | The sets of bus data lines constitute a 32-bit or two word wide bidirectional path for transferring data or identification information between subsystem 20 and bus 10 as a function of the cycle of operation being performed. During a write cycle of operation, the bus data lines transfer information to be written into memory at the location specified by the address signals applied to lines BSAD00-BSAD23. During the first half of a read cycle of operation, the data lines transfer identification information (channel number) to the subsystem 20. During the second half of the read cycle, the data lines transfer the information read from memory. |
| BSDP00, BSDP08, BSDP16, BSDP24 | The bus data parity lines are two sets of bidirectional lines which provide odd parity signals coded as follows:<br>BSDP00=odd parity for signals applied to lines BSDT00-BSDT07 (left byte);<br>BSDP08=odd parity for signals applied to lines BSDT08-BSDT15 (right byte);<br>BSDP16=odd parity for signals applied to lines BSDT16-BSDT23; and<br>BSDP24=odd parity signals applied to lines BSDT24-BSDT31.<br>Control Lines |
| BSMREF | The bus memory reference line extends from bus 10 to the memory subsystem 20. When set to a true state, this line signals the subsystem 20 that the lines BSAD00-BSAD23 contain a complete memory controller address and that it is performing a write or read operation upon the specified location. When reset to a false state, the line signals subsystem 20 that the lines BSAD00-BSAD23 contain information directed to another unit and not subsystem 20. |
| BSWRIT | The bus write line extends from the bus 10 to the memory subsystem 20. This line when set to a true state, in conjunction with line BSMREF being true, signals subsystem 20 to perform a write cycle of operation. When reset to a false state, this line, in conjunction with line BSMREF being true, signals subsystem 20 to perform a read cycle of operation. |
| BSBYTE | The bus byte line extends from bus 10 to subsystem 20. This line, when set to a true state, signals subsystem 20 that it is to perform a byte operation rather than a word operation. |
| BSLOCK | The bus lock line extends from bus 10 to subsystem 20. When set to a true state, this line signals subsystem 20 of a request from central processor 40 to test or change the status of a memory lock flip-flop included within the controller 200. |
| BSSHBC | The bus second half bus cycle line is used to signal a unit that the current information applied to bus 10 by subsystem 20 is the information requested by a previous read request. In this case, both subsystem 20 and the unit receiving the information are busy to all units from the start of the initiation cycle until subsystem 20 completes the transfer. This line is used in conjunction with the BSLOCK line to set or reset its memory lock flip-flop. When a unit is requesting to read or write and line BSLOCK is true, the line BSSHBC, when true, signals subsystem 20 to reset its lock flip-flop. When in a false state, it signals subsystem 20 to test and set its lock flip-flop. |
| BSMCLR | The bus master clear line extends from bus 10 to subsystem 20. When this line is set to a true state, it causes the subsystem 20 to clear to zeros certain bus circuits within controller 200.<br>Bus Handshake/Timing Lines |
| BSREQT | The bus request line is a bidirectional line which extends between bus 10 and subsystem 20. When set to a true state, it signals the subsystem 20 that another unit is requesting a bus cycle. When reset to a false state, it signals subsystem 20 that there is no bus pending bus request. This line is forced to a true state by subsystem 20 to request a read second half bus cycle. |
| BSDCNN | The data cycle line is a bidirectional line which extends between bus 10 and subsystem 20. When forced to a true state, the line signals the subsystem 20 that a unit was granted a requested bus cycle and placed information on the bus for another unit. The subsystem 20 forces the line to a true state to signal that it is transmitting requested data back to a unit. Prior to this, subsystem 20 had requested and been granted a bus cycle. |
| BSACKR | The bus acknowledge line is a bidirectional line which extends between the bus 10 and subsystem 20. When set to a binary ONE by subsystem 20, the line signals that it is accepting a bus transfer during a read first half bus cycle or write cycle. During a read second half bus cycle, this line when set to a binary ONE by the unit which originated the request signals the subsystem 20 of its acceptance of a transfer. |
| BSWAIT | The bus wait line is a bidirectional line which extends between bus 10 and subsystem 20. When set to a true or binary ONE state by subsystem 20, it signals a requesting |

MEMORY SUBSYSTEM INTERFACE LINES -continued

| Designation | Description |
| --- | --- |
| | unit that the subsystem cannot accept a transfer at this time. Thereafter, the unit will initiate successive retries until the subsystem 20 acknowledges the transfer. The subsystem 20 sets the BSWAIT line true under the following conditions:<br>1. It is busy performing an internal read or write cycle of operation.<br>2. It is requesting a read second half bus cycle.<br>3. It is anticipating a refresh operation.<br>4. It is performing a refresh operation.<br>5. It is busy when placed in an initialize mode.<br>When the BSWAIT line is set to a true or binary ONE state by a unit, this signals the subsystem 20 that the data is not being accepted by the requesting unit and to terminate its present bus cycle of operation. |
| BSNAKR | The bus negative acknowledge line is a bidirectional line which extends between the bus 10 and subsystem 20. When this line is set to a true or binary ONE state by subsystem 20, it signals that it is refusing a specified transfer. The subsystem 20 sets line BSNAKR to a true state as follows:<br>1. Memory lock flip-flop is set to a binary ONE, and<br>2. The request is to test and set the lock flip-flop (BSLOCK true and BSSHBC false).<br>In all other cases, when the memory lock flip-flop is set, subsystem 20 generates a response via the BSACKR line or the BSWAIT line or generates no response. When the BSNAKR line is forced true by a unit, this signals subsystem 20 that the data is not accepted by the unit and to terminate its cycle of operation. |
| | Tie Breaking Control Lines |
| BSAUOK-BSIUOK | The tie breaking network lines extend from bus 10 to subsystem 20. These lines signal subsystem 20 whether units of higher priority have made bus requests. When all the signals on these lines are binary ONES, this signals subsystem 20 that it has been granted a bus cycle at which time it is able to force the BSDCNN line to a binary ONE. When any one of the signals on the lines is a binary ZERO, this signals subsystem 20 that it has not been granted a bus cycle and is inhibited from forcing line BSDCNN to a binary ONE. |
| BSMYOK | The tie breaking network line extends from subsystem 20 to bus 10. Subsystem 20 forces this line to a false or binary ZERO state to signal other units of lower priority of a bus request. |

Memory Subsystem 20

Figure 3:
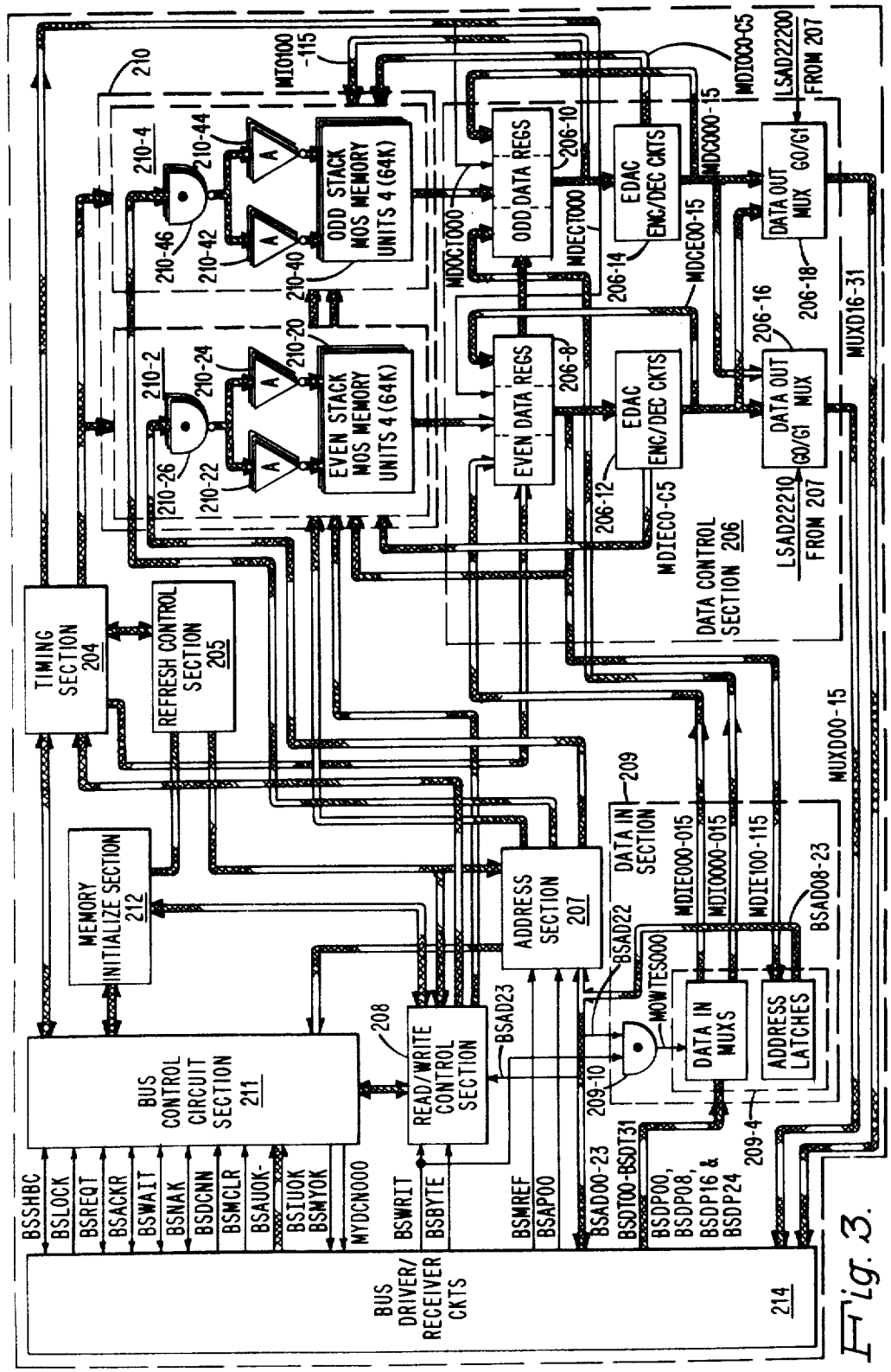
FIG. 3 shows in block diagram form, the memory subsystem 20 of FIG. 1.

FIG. 3 shows a preferred embodiment of a memory subsystem which is constructed using the principles of the present invention. Referring to FIG. 3, it is seen that subsystem 20 includes a memory controller 200 which controls the four 128K word memory module units 210-2 and 210-4 of memory section 210. The module units of blocks 210-2 and 210-4 include high speed MOS random access memory integrated circuits designated by blocks 210-20 and 210-40, and address buffer circuits designated by blocks 210-22 through 210-46. Each 128K memory unit is constructed from 64K word by one bit dynamic MOS RAM chips illustrated in greater detail in FIG. 4c. More specifically, referring to FIG. 4c, it is seen that each of the four 128K by 22 bit memory modules includes forty-four 65,534 (64K) word by one bit chips. Within each chip there are a number of storage arrays organized in a matrix of 256 rows by 256 columns of storage cells.

The controller 200 includes those circuits required to generate memory timing signals, perform refresh operations, data transfer operations, address distribution and decoding operations and bus interface operations. Such circuits are included as part of the different sections of FIG. 3.

The sections include a timing section 204, a refresh control section 205, a data control section 206, an address section 207, a read/write control section 208, a data in section 209, a bus control circuit section 211 and memory initialize circuit section 212.

The bus control section 211 includes the logic circuits which generate signals for generating and accepting bus cycle requests for single and double wide word operations. As seen from FIG. 3, these circuits as well as the circuits of other sections are connected to bus 10 via driver and receiver circuits, conventional in design. It will be noted that the binary ONE and ZERO states of the signals on bus 10 and those utilized within sybsystem 20 differ. The bus signals operate with negative logic while the subsystem 20 utilizes positive logic. The section 211 includes the tie breaking network circuits which resolves request priority on the basis of a unit's physical position for the bus. The memory subsystem 20, located at the left most or bottom position, is assigned the highest priority while the CPU 40, located at the highest most or top position, is assigned the lowest priority. For further information regarding bus operation, reference may be made to the above mentioned U.S. patents and U.S. patent applications.

Figure 4A:
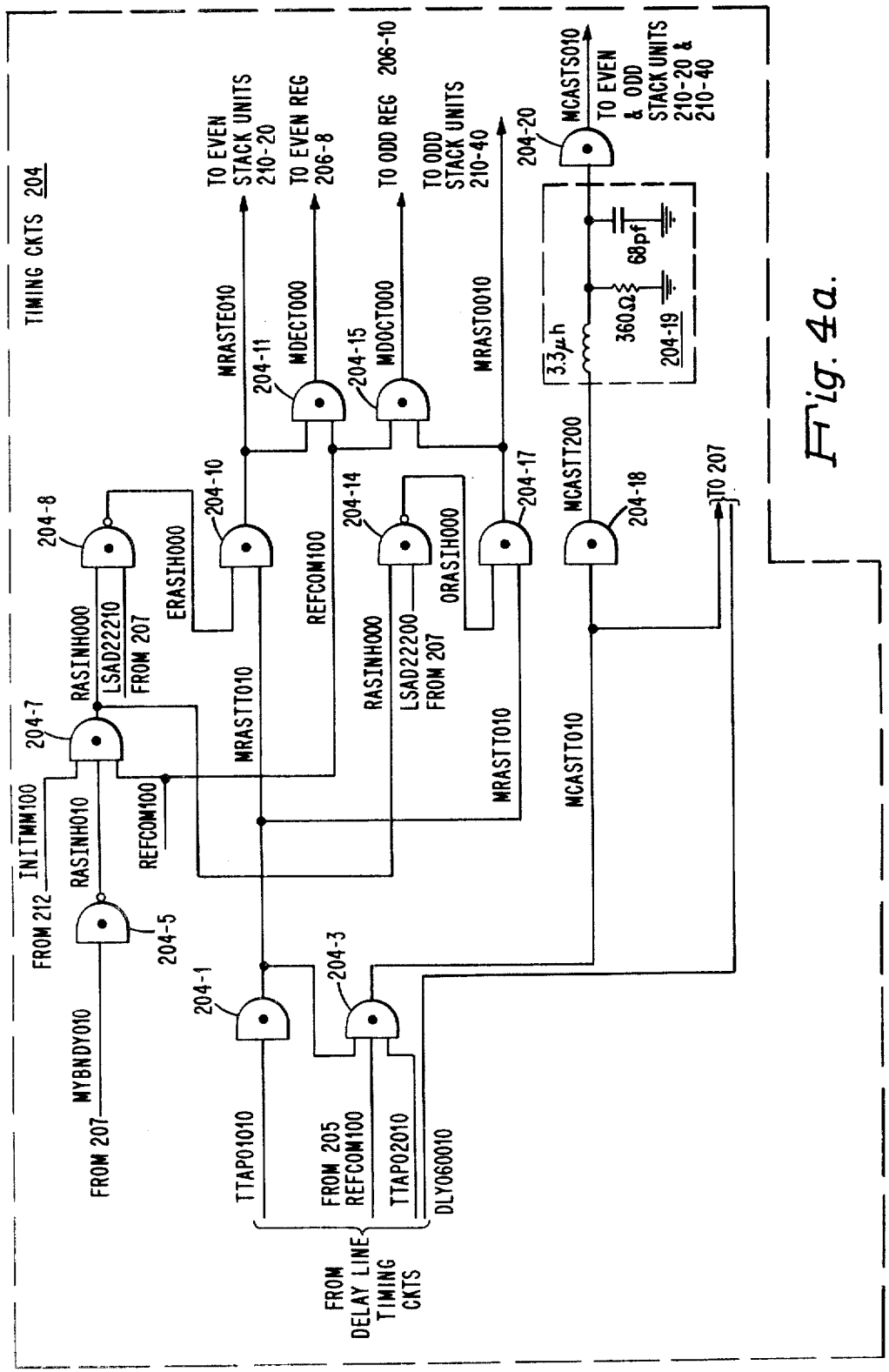
FIGS. 4a through 4c illustrate in greater detail different portions of the memory subsystem 20 of FIG. 3.
Figure 4B:
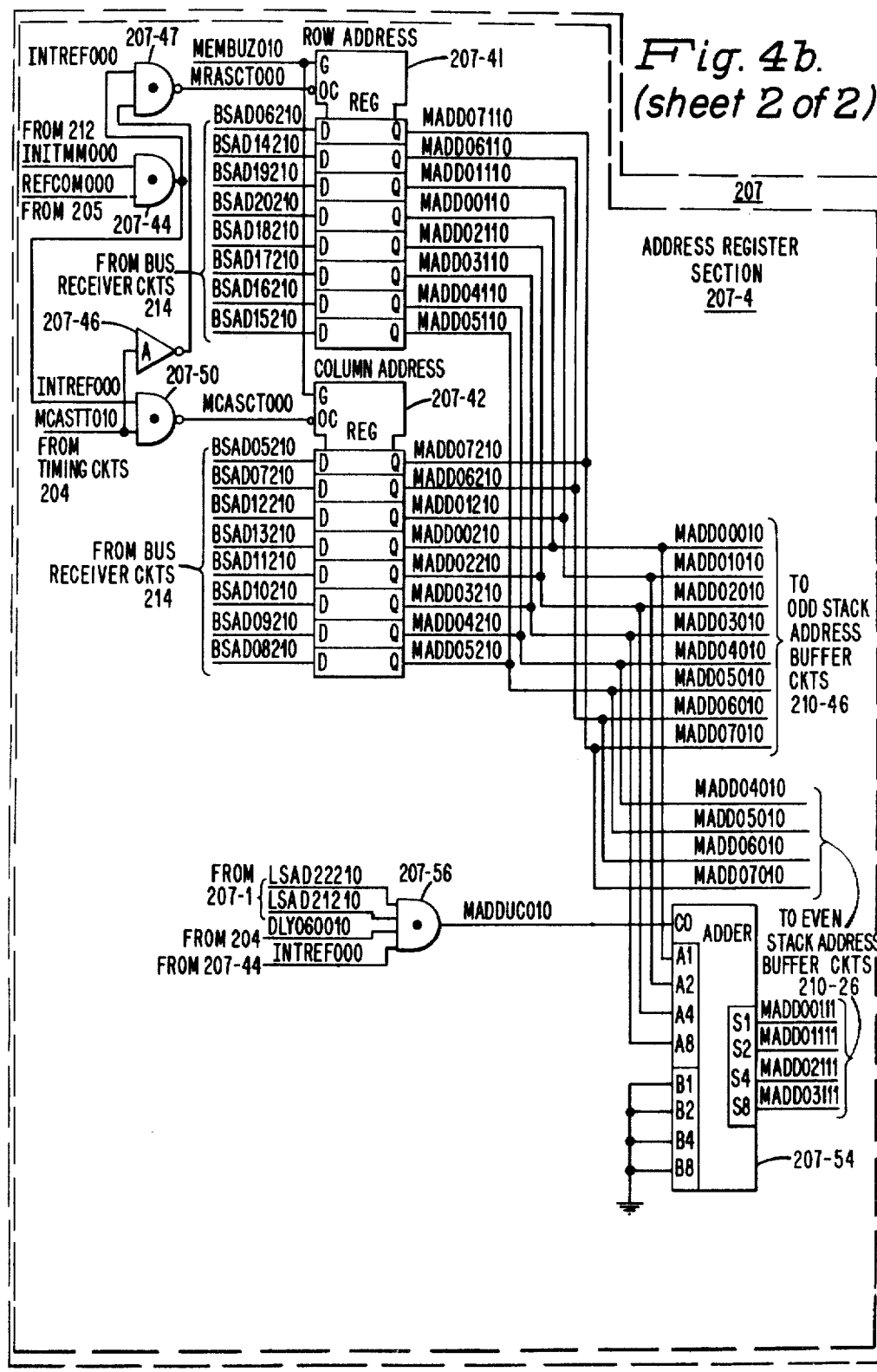

The timing section 204, shown in detail in FIG. 4b, includes circuits which generate the required sequence of timing signals for memory read and write cycles of operation. As seen from FIG. 3, this section transmits and receives signals to and from sections 205, 206, 207, 208 and 211.

In accordance with the present invention, the address section 207, shown in greater detail in FIG. 4b, includes circuits which decode, generate and distribute address signals required for initialization and read/write selection. The section 207 receives address signals from lines BSAD00-BSAD23 and BSAP00 in addition to the memory reference control signal from the BSMREF line. Additionally, section 207 receives control and timing signals from sections 204 and 212.

The memory initialize section 212 includes circuits, conventional in design, for clearing the memory subsystem circuits to an initial or predetermined state.

The read/write control section 208 includes register and control logic circuits, conventional in design. The register circuits receive and store signals corresponding to the states of the BSWRIT and BSBYTE control lines and the address line BSAD23. The control circuits decode the signals from register circuits and generate signals applied to sections 204, 207 and 210 for establishing whether the subsystem is to perform a read, write or a read followed by a write cycle of operation (i.e., for a byte command).

The refresh section 205 includes the circuits for periodically refreshing the contents of memory. Section 205 receives timing and control signals from section 204 and provides control signals to sections 204, 207, 208 and 212.

The data in section 209 circuits of block 209-4 include a pair of multiplexer circuits and an address register which is connected to receive signals from section 206.

The multiplexer circuits, conventional in design, receive data words from the two sets of bus lines BSDT00-15 and BSDT16-31 and apply the appropriate words via the sets of output lines MDIE000-015 and MDIO000-015 to the correct memory modules during a write cycle of operation. That is, multiplexer circuits are selectively enabled by signal MOWTES000 generated by an AND gate 209-10. The AND gate 209-10 generates signal MOWTES000 as a function of bus address bit 22 (i.e., signal BSAD22) and whether the memory subsystem is doing a write operation (i.e., signal BSWRIT). During a write operation, signal MOWTES000 applies the correct data word (i.e., the word applied to bus lines BSDT00-15 or BSDT16-31) into the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be with the module identification information transmitted via the bus lines BSDT00-15. Since this is not pertinent to an understanding of the present invention, it will not be further discussed herein.

The data control section 206 includes the registers 206-8 and 206-10 and data out multiplexer circuits 206-16 and 206-18. These circuits enable data to be written into and/or read from the odd and even memory units 210-20 and 210-40 of section 210 under the control of signals from sections 204 and 207. During a read cycle of operation, operand or instruction signals are read out simultaneously from the units 210-20 and 210-40 into the even data and odd data registers 206-8 and 206-10. During a write cycle of operation, operand signals are loaded into the even data and odd data registers 206-8 and 206-10 from section 209 and written into the memory units of section 210.

For the ease of illustration, the even data and odd data registers 206-8 and 206-10 are shown as a single block. However, it should be understood that these registers actually are made up of three distinct registers represented by the dotted lines in each block. The reason is that multiple registers are required for using the EDAC generation and correction logic circuits during both read and write cycles.

It will be noted that the outputs of these registers connect in common. In order to provide the appropriate transfers of data during read, write and byte write operations, the appropriate register is enabled by the tristate control. As explained herein, such registers are constructed from D type transparent latch circuits such as those designated by Texas Instruments Incorporated. In the case of a read operation, this enables the address ID information received from the bus 10 to be transferred to the address latches of block 209-4. For the purposes of the present invention, it can be assumed that the appropriate data register is enabled during the processing of memory requests.

The section 206 further includes an error detection and correction (EDAC) capability wherein each word contains 16 data bits and 6 check bits used to detect and correct single bit errors in the data words and detect and signal without correction, double bit errors in the data word.

The EDAC capability is provided by the EDAC encoder/decoder circuits 206-12 and 206-14. These circuits, as shown, connect to the even and odd data registers 206-8 and 206-10. During read and write cycles of operation, they perform the required encoding and decoding operations. The encoder/decoder circuits may be considered conventional in design and may for example take the form of those circuits disclosed in U.S. Pat. No. 4,072,853 which issued Feb. 7, 1978.

DETAILED DESCRIPTION OF CONTROLLER SECTIONS

Only those sections which are believed necessary to an understanding of the present invention are described herein. For further information regarding the remaining sections, reference may be made to the related patent applications or to copending patent application "A Dynamic Memory System which Includes Apparatus for Performing Refresh Operations in Parallel with Normal Memory Operations".

Section 204

FIG. 4a illustrates in greater detail, the timing circuits of section 204. The circuits receive input timing pulse signals TTAP01010, TTAP02010 and DLY060010 from delay line timing generator circuits, not shown, conventional in design. The timing generator circuits generate a series of timing pulses via a pair of series connected 200 nanosecond delay lines in response to the signal MYACR010 being switched to a binary ONE. These pulses in conjunction with the circuits of block 204 establish the timing for the remaining sections during a memory cycle of operation.

Additionally, the circuits of block 204 receive a boundary signal MYBNDY010, address signals LSAD22200 and LSAD22210 from section 207. Also, section 212 applies an initialize signal INITMM100 to section 204. The signal MYBNDY010 is applied to a NAND gate 204-5 which forces signal RASINH010 to a binary ZERO. The series connected AND gate 204-7 logically combines initialize signal INITMM100, refresh command signal REFCOM100 generated by circuits within section 204, not shown, to produce signal RASINH000. A NAND gate 204-8 combines signals RASINH000 and address signal LSAD22210 to produce an even row strobe inhibit signal ERASIH000. The signal is applied to an AND gate 204-10 for combining with a timing signal MRASTT010 derived from signal TTAP01010 via an AND gate 204-1. The result output signal MRASTE010 is applied to the RAS timing input of the even stack units 210-20.

A NAND gate 204-14 combines signals RASINH000 and LSAD222000 to produce an odd row inhibit signal ORASINH000. This signal is combined in an AND gate 204-17 with timing signal MRASTT010 to generate row timing signal MRAST0010. This signal is applied to the RAS timing input of the odd stack units 210-40.

As seen from FIG. 4a, an AND gate 204-11 applies a timing signal MDECT000 to the even data register 206-8 in the absence of a refresh command (i.e., signal REFCOM-100=0). Similarly, an AND gate 204-15 applies a timing signal MDOCT000 to the odd data register 206-10. The delay network 204-19 which connects in series with AND gates 204-3, 204-18 and 204-20 generate timing signal MCASTS010. The signal MCASTS010 is applied to the CAS timing input of the even and odd stack units 210-20 and 210-40.

The signal DLY060010 generated by the delay line timing circuits switches to a binary ZERO, 60 nanoseconds following the start of the memory cycle. It remains a binary ZERO during the interval that the column addresses are latched into the RAM chips. This ensures that only the row addresses are incremented in accordance with the teachings of the present invention.

Section 207

FIG. 4b illustrates the different sections of address section 207. As shown, section 207 includes an input address section 207-1, an address decode section 207-2 and an address register section 207-4. The input address section 207-1 includes a set of manually selectable switches of block 207-10 which receive bus address signals BSAD04110 and BSAD06110. These switches select the high order bus address bit which selects the upper/lower 256K of memory when the system includes the full complement of 128K memory modules (i.e., modules A-D). When the memory modules are constructed using 64K chips, the top switch is placed in the closed position. This selects address bit 4 (signal BSAD04110) as the high order bus address bit. For 16K chips, the other switch is placed in the closed position which selects address bit 6.

Since it is assumed that the memory modules use 64K chips, the top switch is closed while the other switch is opened. The resulting high order bit signal BSADX6010 in addition to its complement along with the least significant bus address bits 22 and 21 are stored in a register 207-12. An inverter circuit 207-14 generates complement signal BSADX6000. The four signals are loaded into register 207-12 when address strobe signal ADDSTR000 is forced to a binary ZERO. This occurs when the memory is busy (i.e., accepts a bus cycle/a memory request).

The outputs of register 207-12 are applied as inputs to the section 207-2 in addition to sections 204 and 206. The input address section 207-1 also includes boundary detection circuits of block 207-15. The circuits include a NAND gate 207-16 which connects to the D input terminal of a D type flip-flop 207-18 via an AND gate 207-17. The NAND gate 207-16 receives the memory request address bits 22-17 from bus 10 and forces output detected boundary signal DBSA64000 to a binary ZERO when address bits 22-17 are all binary ONES. This, in turn, causes flip-flop 207-18 to switch from a binary ONE to a binary ZERO state forcing signal MYBNY010 to a binary ZERO. The signal MYBNDY010 is applied as an input to timing section 204.

As shown, the least significant address bit signals LSAD22210 and LSAD21210 are applied to the input terminals of a binary decoder circuit 207-20. The least significant bit address signal LSAD22210 and its complement signal LSAD22200 generated by an inverter circuit 207-22 are applied to sections 204 and 206. The high order bit signal LSADK6210 is applied to the enable/gate input terminal of decoder circuit 207-20. The complement signal LSADX6200 is applied to the enable/gate input of decoder circuit 207-40, together with address signals LSAD22210 and LSAD21210.

Each of the four decode outputs DECOD0000 through DECOD3000 connects to a different pair of the NAND gates 207-24 through 207-30. It will be noted that the zero decode signal DECOD0000 connects to the inputs of NAND gates 207-24 and 207-26 which generate the 0 and 1 row address strobe signals. Similarly, the 1 decode signal DECOD1000 connects to the inputs of NAND gates 207-26 and 207-28 which generate the 1 and 2 row address strobe signals. The next sequential decode signal DECOD2000 connects to the two NAND gates which generate the next pair of sequential row address strobe signals. Lastly, the last decode signal DECOD3000 connects to NAND gates 207-30 and 207-24 which generate the 3 and 0 row address strobe signals.

In an identical fashion to that just described, each of the four decode outputs DECOD4000 through DECOD7000 connects to a different pair of the NAND gates 207-32 through 207-38. That is, the 0 decode signal DECOD4000 connects to the inputs of NAND gates 207-32 and 207-34 which generate the 4 and 5 row address strobe signals. The 5 decode signal DECOD5000 connects to the inputs of NAND gates 207-34 and 207-36 which generate the 5 and 6 row address strobe signals. The next sequential decode signal DECOD6000 connects to the two NAND gates which generate the next pair of sequential row address strobe signals. Lastly, the last decode signal DECOD7000 connects to NAND gates 207-38 and 207-32 which generate the 7 and 4 row address strobe signals.

As shown, the even row address strobe signals DRAST0010 through DRAST6010 are applied to the RAM chips of the even stack units 210-20. The odd row address strobe signals DRAST1010 through DRAST7010 are applied to the RAM chips of the odd stack units 210-40.

The address decode section 207-2 of section 207 is included for the sake of completeness. The apparatus of this section forms a part of the subject matter of copending patent application "Sequential Chip Select Decode Apparatus and Method" previously referenced. Therefore, this section was discussed to the extent necessary for a complete understanding of the present invention. Section 207-4 shows in greater detail the addressing arrangement of the present invention.

Referring to FIG. 4b, it is seen that the bus address signals via the bus receiver circuits of block 214 of FIG. 3 as inputs to different stages of a tristate operated row address register 207-41 and a tristate operated column address register 207-42. The enabling gate input terminals of both registers are connected to receive a memory busy signal MEMBUZ010 from section 204. The OC input terminal of row address register 207-40 is connected to receive a timing signal MRASCT000 generated by AND gate 207-32, inverter circuit 207-46 and NAND gate 207-47 in response to signals INITMM000, REFCOM000 and MCASTT010. The OC input terminal of column address register 207-42 is connected to receive a timing signal MCASCT000 generated by NAND gate 207-32 and NAND gate 207-38 in response to signals INITMM000, REFCOM000 and MCASTT010.

Each of the address registers 207-41 and 207-42 are constructed from D type transparent latch circuits such as those designated as SN74S373 manufactured by Texas Instruments Incorporated. The register circuits are transparent meaning that while the G input terminal is a binary ONE, the signals at the Q output terminals follow the signals applied to the D input terminals. As seen from FIG. 4b, the different address output terminals of the register of each set are connected in common in a wired OR arrangement for enabling the multiplexing of these address signals. Such multiplexing is accomplished by controlling the state of the signals applied to the output control (OC) input terminals of the registers 207-41 and 207-42.

More specifically, the output control (OC) terminals enable so-called tristate operation which are controlled by the circuits 207-32 through 207-38. When each of the signals MRASCT000 and MCASCT000 is in a binary ONE state, this inhibits any address signal from being applied at the Q output terminals of that register. However, this operation is independent of the latching action of the register flip-flops. Additionally, section 207-4 includes a 4-bit binary full adder circuit 207-54, conventional in design. The adder circuit 207-54 is connected to increment by one, the low order address bits 20 through 17. In greater detail, the input terminal A1–A8 receive signals MADD00110 through MADD03110. Binary ZERO signals are applied to input terminals B1–B8. An AND gate 207-56 generates a carry in signal MADDUC010 as a function of the states of the least significant address signals LSAD22210 and LSAD21210, signal INTREF000 and timing signal DLY060010.

Figure 4C:
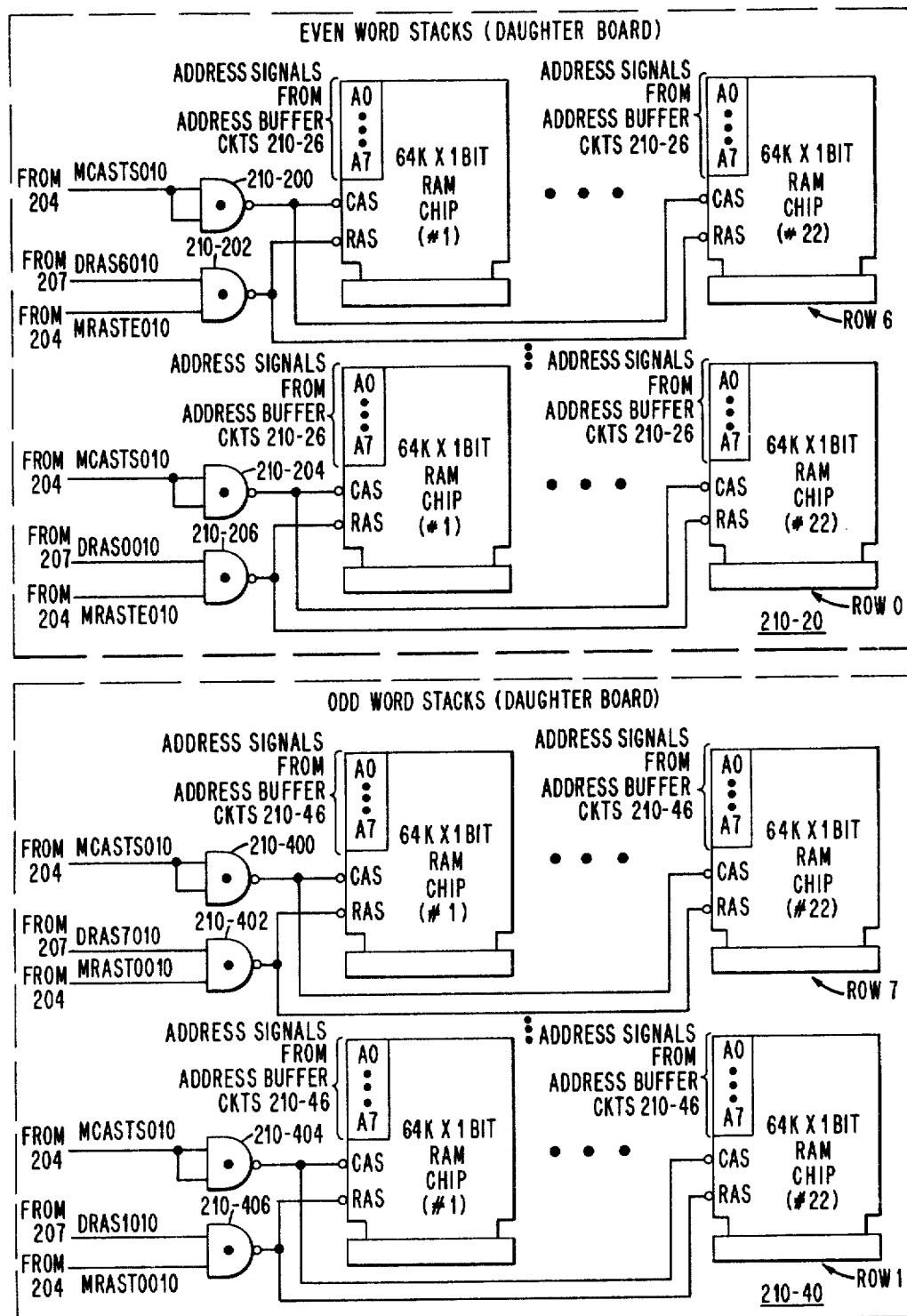

The incremented output signals MADD00111 through MADD03111 appearing at adder sum terminals S1–S8 are applied via address buffer circuits 210-26 to the even stack RAM chips of FIG. 4c. The same is true of signals MADD04010 through MADD07010. The odd stack RAM chips of FIG. 4c are connected to receive the address signals MADD0010 through MADD07010 via address buffer circuits 210-46.

Memory Units 210-20 and 210-40-FIG. 4c

As previously discussed, the even word and odd word stacks of blocks 210-20 and 210-40 are shown in greater detail in FIG. 4c. These stacks include four rows of 22 64K×1-bit RAM chips as shown. The chips and associated gating circuits are mounted on a daughter board. Each daughter board includes 8, 2 input positive NAND gates (e.g. 210-200 through 210-206 and 210-400 through 210-406) which are connected to receive the row and column timing signals from section 204 and the row decode signals from section 207. Only those chip terminals pertinent to an understanding of the present invention are shown. The remaining terminals, not shown, are connected in a conventional manner. For further information, reference may be made to the copending patent application "Rotating Chip Selection Technique and Apparatus", invented by Chester M. Nibby, Jr. and William Panepinto, Jr., Ser. No. 921,292, filed on July 3, 1978 and assigned to the same assignee as named herein.

DESCRIPTION OF OPERATION

Figure 5:
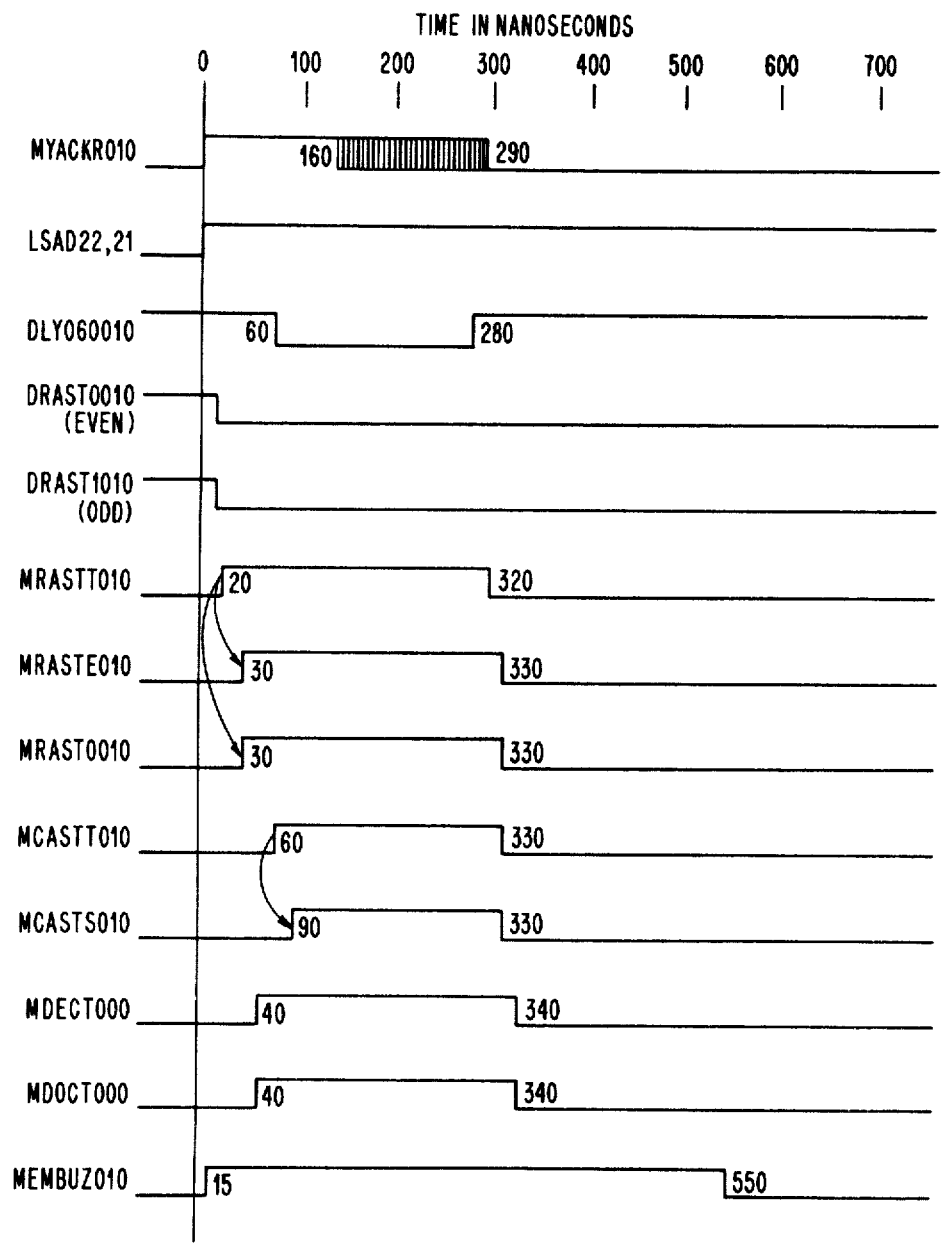
FIG. 5 is a timing diagram used in describing the operation of the present invention.
Figure 6A:
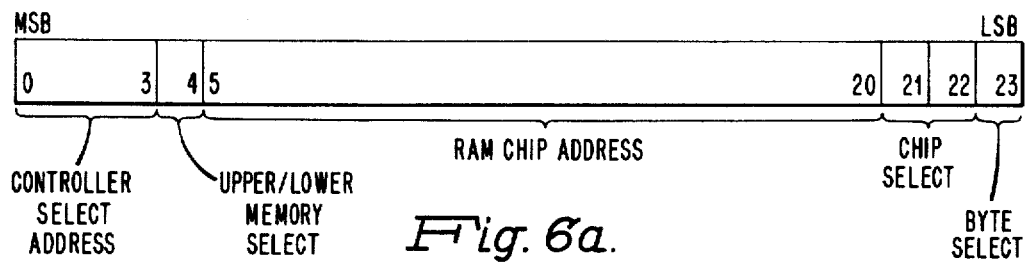
FIG. 6a illustrates the format of the address applied to the memory subsystem of FIG. 1.
Figure 6B:
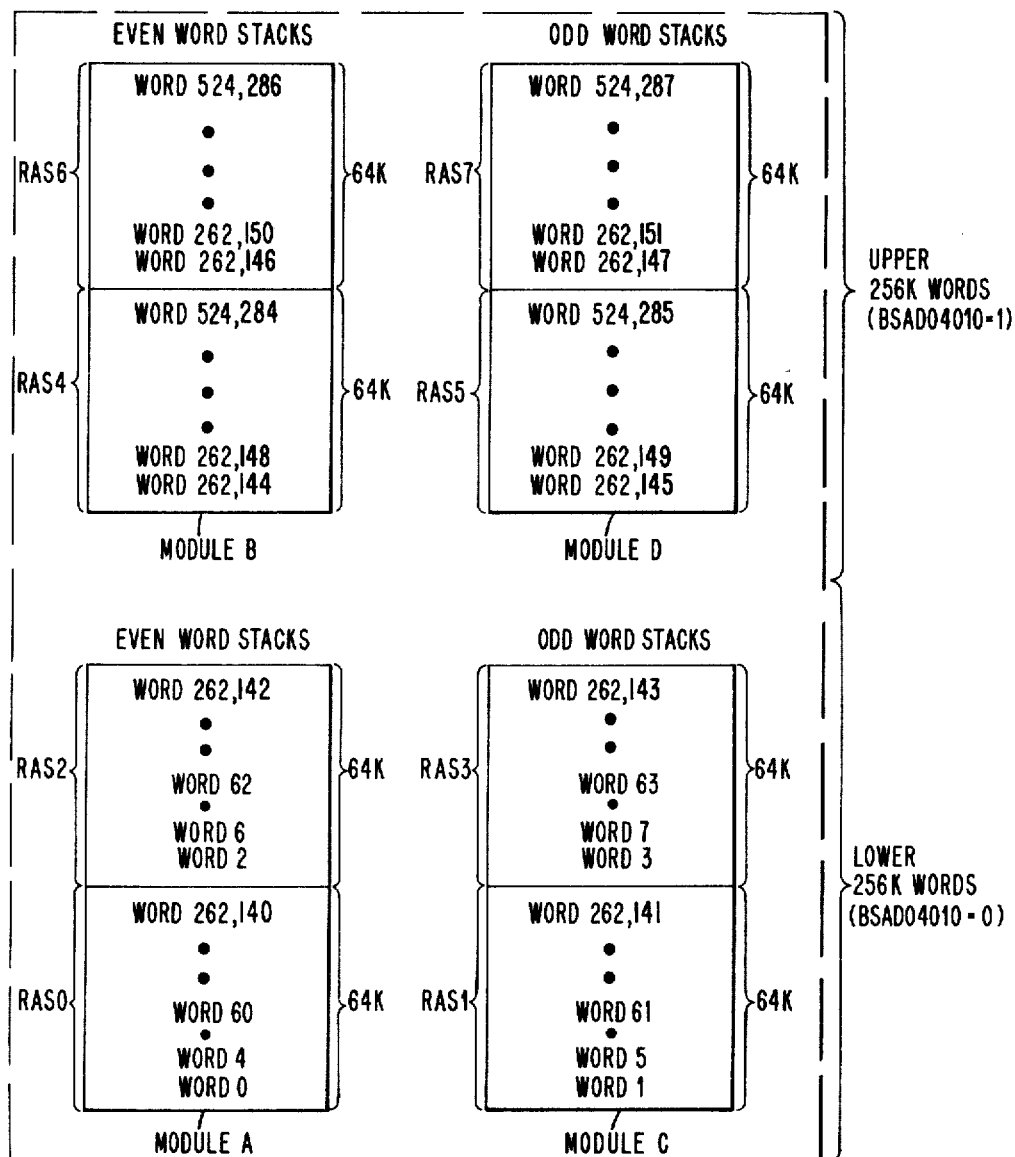
FIG. 6b illustrates the organization of memory modules of FIG. 1.

With reference to FIGS. 1–6b, the operation of the preferred embodiment of the present invention will now be described with particular reference to the timing diagram of FIG. 5. It will be assumed that each of the units 210-2 and 210-4 include four 128K modules as shown in FIGS. 1, 4c and 6b. It will be obvious that each of the units 210-2 and 210-4 can include any number of stack units with the provision that both of the units 210-2 and 210-4 include the same number of stack units.

Before discussing an example of operation with reference to FIG. 5, reference is first made to FIGS. 6a and 6b. FIG. 6a illustrates the format of the memory addresses applied to the memory subsystem as part of each memory read or write request. The high order/most significant bit positions are coded to identify the memory module/controller to process the request. Address bit 4 is used to select which 256K half (i.e., upper or lower half) of controller memory is being accessed. These address bits are processed by the circuits of memory subsystem 20 and are not provided to the RAM chips. Processing proceeds in a conventional manner such as disclosed in the above cited copending patent applications.

FIG. 6b illustrates the word memory organization of modules A through D of FIG. 1. As shown, the first 256K words are provided by modules A and C. The next 256K words are provided by modules B and D. These pairs of modules are selected as a function of the state of bus address bit 4 as previously mentioned. FIG. 6b will be referenced to explain the manner in which the apparatus of the present invention achieves sequential word addressing in the presence of subboundary conditions and extends the subboundary conditions to eliminate any adverse effect on memory system operations.

Address bits 5–20 specify the address of the 22-bit storage location within the RAM chips being addressed. As explained in greater detail herein, these 16 address bits are multiplexed into 8 address inputs and applied via the address buffer circuits of blocks 210-26 and 210-46 to the address input terminals A0–A7 of the RAM chips of FIG. 4c.

According to the teachings of the present invention, the least significant address bits 21–22 are coded to select which row of RAM chips are being addressed. As explained herein in greater detail, these bits are decoded and used to generate a pair of row address strobe (RAS) signals which latch the 8-bit row addresses into the desired row of RAM chips within each memory stack.

FIG. 5 illustrates diagrammatically the relationships between the different timing and control signals generated by the circuits of sections 207 and 204 during a single memory cycle of operation. From FIG. 5, it is seen that the various signals shown are referenced with respect to signal MYACKR010 which starts a memory cycle of operation. It is assumed that subsystem 20 receives a memory command which includes an address having the format of FIG. 6a. This results in the switching of signal MYACKR010 to a binary ONE. The signal MYACKR010 causes the circuits of block 204 to force the memory busy signal MEMBUZ010 to a binary ONE indicating that the memory subsystem has begun a memory cycle of operation (i.e., memory is busy).

In response to the memory busy signal MEMBUZ010, the bus address signals BSAD05210 through BSAD20210 are loaded into row address register 207-40 and column address register 207-42. Also, signal MEMBUZ010 switches signal ADDSTR000 of FIG. 4b to a binary ZERO. This loads the least significant address bit signals BSAD22110 and BSAD21110 in addition to signal BSADX610 into register 207-12.

As seen from FIG. 4b, the stored address signals LSAD22210 and LSAD21210 are decoded by decoder circuits 207-20 and 207-40 which are enabled for operation by signals LSADX6210 and LSADX6200, respectively. By way of example, it is assumed that the address bits 4-20 are all ZEROS. Accordingly, the decoder circuit 207-20 enabled by signal LSADX6210 forces the zero decode signal DECOD0000 to a binary ZERO. This signal conditions NAND gates 207-24 and 207-26 to force signals DRAST0010 and DRAST1010 to binary ONES. As seen from FIG. 4c, the signal DRAST0010 is applied as one input of NAND gate 210-206 of the even word stack 210-20. The signal DRAST1010 is applied as one input of NAND gate 210-406 of the odd word stack 210-40. When the timing signals MRASTE010 and MRAST0010 are generated, the NAND gates 210-206 and 210-406 force their outputs to binary ZEROS. This, in turn, results in the storing of the row address signals from row address register 207-41 applied via the address buffer circuits to the terminals A0-A7 of both rows of RAM chips within stacks 210-20 and 210-40.

In greater detail, the timing circuits of FIG. 4a in response to signal MYACKR010 begin a cycle of operation during which timing signals TTAP01010 and TTAP02010 are generated. These signals cause gates 204-1, 204-3, 204-10 and 204-17 to generate signals MRASTT010, MCASTT010, MRASTE010 and MRAST0010, respectively, at the times shown in FIG. 5. As mentioned, the row timing signals MRASTE010 and MRAST0010 together with corresponding ones of the row decode signals DRAST0010 and DRAST1010 generate even and odd row address strobe signals which are applied to the RAS terminals of both rows of RAM chips. At that time, signal MCASTT010 is a binary ZERO. From FIG. 4b, it is seen that the output signal MRASCT000 from NAND gate 207-47 is a binary ZERO at this time (i.e., when signal MCASTT010 is a binary ZERO). This conditions row address register 207-41 to apply the all ZERO bus address signals at its inputs to its output terminals. From there, the address signals MADD00010-MADD07010 are applied to the odd stack address buffer circuits 210-46. As seen from FIG. 4b, the high order 4 row address bits are also applied to the even stack address buffer circuits 210-26. Since the least significant address bits LSAD21210 and LSAD22210 have the value "00", AND gate 207-56 holds signal MADDUC010 at a binary ZERO during the interval signal DLY060010 is a binary ONE (i.e., during RAS time). Accordingly, the low order 4 row address bits pass through adder circuit 207-54 unincremented. Accordingly, both rows of RAM chips latch or store the 8-bit all ZERO row address signals applied to the A0-A7 terminals.

As seen from FIG. 4a, timing signal MCASTT010 causes delay network 204-19, gates 204-18 and 204-20 to generate signal MCASTS010 at the time shown in FIG. 5. The signal MCASTS010 is applied via NAND gate 210-200, 210-204, 210-400 and 210-404. This results in a column address strobe signal being applied to the CAS terminals of the rows of RAM chips. However, since signal DLY060010 is a binary ZERO, rows of RAM chips latch or strobe the 8-bit column address signals applied to the A0-A7 terminals.

In greater detail, when signal MCASTT010 switches to a binary ONE, signals MRASCT000 and MCASCT000 switch to a binary ONE and binary ZERO, respectively. The result is that the bus address signals BSAD05200 and BSAD07210 through BSAD13210 are applied to the output terminals of register 207-42. At the same time, register 207-41 is inhibited from applying bus address signals to its output terminals. From there, the column address signals MADD00010 through MADD07010 are applied to the odd and even buffer circuits 210-46 and 210-26. That is, since signal DLY060010 is a binary ZERO during this interval (i.e., during CAS time), AND gate holds signal MADDUC010 in a binary ZERO state.

In the example under consideration, the all ZERO memory address causes the contents of the storage locations of memory modules A and C of FIG. 6b defined by the ZERO row and column address values storing word 0 and word 1 to be accessed. This results in word 0 and word 1 being loaded into the even data and odd data registers 206-8 and 206-10, respectively, in response to signals MDECT000 and MDOCT000 of FIG. 5.

From there, word 0 and word 1 are applied to lines MUXD00-15 and MUXD16-31 of FIG. 3 via the data out multiplexer circuits 206-16 and 206-18 as a function of the state of the least significant address bit LSAD22. That is, when signal LSAD22210 is a binary ZERO, the contents of the even data register 206-8 is applied to lines MUXD00-15 by multiplexer circuit 206-16. The multiplexer circuit 206-18 applies the odd data register contents to lines MUXD16-31. The reverse of this occurs when address bit LSAD22210 is a binary ONE. In this manner, access to both memory module units can occur without regard to word boundaries. As seen from FIG. 5, the memory cycle of operation is completed when the circuits of section 204 switch the memory busy signal MEMBUZ010 to a binary ZERO.

For the least significant address bit values 00 through 10, the RAM chip address bits 5-20 are the same. However, when the least significant address bits have the value "11", this creates a subboundary address condition. That is, the memory request address specifies that the words 3 and 0 of FIG. 6b be accessed. However, it is desired that words 3 and 4 from modules A and C be accessed and read out to multibus 10. In order to accomplish the accessing of the desired row, adder circuit 207-54 is conditioned to increment by one the row address applied to the RAM chips of the even memory unit 210-20.

In greater detail, the least significant address bit value "11" causes decoder circuit 207-20 to force the "3" decode output signal DECOD3000 to a binary ZERO. This, in turn, causes NAND gates 207-30 and 207-24 to force simultaneiously signals DRAST3010 and DRAST0010 to binary ONES.

Accordingly, signals DRAST3010 and DRAST0010 together with timing signals MRAST0010 and MRASTE010 load the row address signals applied to the A0-A7 terminals into the RAM chips of rows 0 and 3 of memory units 210-20 and 210-40 of FIG. 4c. However, it will be noted that the row address signals applied to the A0-A3 terminals of the RAM chips of row 0 are incremented by one by adder circuit 207-54 when the least significant address bits 21-22 have the value "11". The RAM chips of row 3 as well as the other rows of the odd memory unit 210-40 receive the unincremented row address signals.

Accordingly, words 3 and 4 of modules C and A of FIG. 6b are accessed and read out to bus 10 via multiplexer circuits 206-16 and 206-18 as a function of the state of least significant address bit 22.

It will be appreciated that the next three words are accessed in the manner described above. However, when the memory request address specifies word 7, the adder circuit 207-54 extends the address subboundary condition by incrementing by one the row address applied to the even memory unit RAM chips. This enables words 7 and 8 from modules A and C to be accessed and read out to multiword bus 10.

Addressing proceeds in the above manner until the memory request address specifies word 63. At this point, the range of the adder circuit 207-54 is exceeded. Since it is not possible to provide the correct row address, the boundary circuits of block 207-15 are operative to detect the boundary address condition and switch signal MYBNDY010 to a binary ZERO. That is, the all ONES value of bus address bits 22-17 causes NAND gate 207-16 to switch to a binary ZERO. This switches flip-flop 207-18 to a binary ZERO state.

From FIG. 4a, it is seen that signal MYBNDY010 forces signal RASINH000 to a binary ONE. This conditions NAND gates 204-8 and 204-14 to generate row address strobe inhibit signals ERASIH000 and ORASIH000 as a function of the state of least significant address bit 22. Since bit 22 is a binary ONE, signal LSAD222000 is a binary ZERO which causes NAND gate 204-14 to switch signal ORASIH000 to a binary ONE. At the same time, NAND gate 204-8 switches signal ERASIH000 to a binary ZERO.

The above causes timing section 204 to generate only those timing signals required for accessing odd memory module 210-40. That is, AND gate 204-17 generates timing signal MRAST0010 which causes the row address to be latched into the rows of RAM chips of memory module C. Following the latching of the column address, the contents of storage location 63 defined by the row and column address is accessed and stored in odd data register 206-10 in response to timing signal MDOCT000 generated by AND gate 204-15. Thereafter, word 63 of module C is applied to lines MUXD00-15 and no new data is applied to lines MUXD16-31. It will be appreciated that the state of signal MYBNDY010 may be used to signal the occurrence of the boundary condition to central processing unit 40.

Address sequencing and address decoding proceeds in the above manner until the location corresponding to 256K is reached. From that point on, bus address bit 4 is switched to a binary ONE. As seen from FIG. 4b, this causes signal LSADX6200 to switch to a binary ZERO while signal LSADX6210 switches to a binary ONE. Thus, decoder circuit 207-40 is enabled. The address decoding for the next 256K locations is carried out by decoder circuit 207-40 through the generation of signals DRAST4010 through DRAST7010.

The extension of each subboundary address condition and the detection of an address boundary condition every 64 words proceed as described previously. The only difference is that the rows of RAM chips of modules B and D are enabled instead of modules A and C using signals DRAST4010-DRAST7010 instead of signals DRAST0010-DRAST3010.

From the above, it is seen how the addressing apparatus of the present invention is able to provide simultaneous access to a plurality of sequential word locations during a single bus cycle of operation. Accessing is accomplished by having the addressing apparatus responsive to the least significant address bits of each request which are coded to specify a first row of RAM chips to be accessed within a first one of a plurality of memory modules. The addressing apparatus includes a minimum of storage and operates without any adverse effect on memory system performance. The arrangement of the invention also permits double word access to start with even or odd word addresses in the case of read/write operations and with a minimum of circuits.

It will be appreciated by those skilled in the art that many changes may be made to the illustrated embodiment. For example, the address boundary conditions may be adjusted by altering the size of the adder circuit 207-54 and modifying the boundary circuits of block 207-15.

For example, as illustrated, the sequential addressing apparatus of the present invention may be used with memory module units having any number of rows of chips. Also, the invention may be used to access any number of storage locations within a corresponding number of memory module units. Again, the invention permits addressing to start with any word in any memory module unit. That is, a 4 module system would be organized as follows:

Module 0 contains words 0, 4, . . . ,
Module 1 contains words 1, 5, . . . ,
Module 2 contains words 2, 6, . . . ,
Module 3 contains words 3, 7, . . . .

The number of least significant bits would be increased from 2 to 3. Also, the number of adder circuits would be increased from 1 to 3 with each adder circuit constructed to include its own carry input logic circuits for detecting different subboundary conditions. In this arrangement, module 3 is similar to the previously described odd module unit in that it does not require an adder circuit to be connected in series with its address input lines. Module 2 adder carry logic circuits operate to detect least significant address bit value 111 as subboundary condition similar to the adder carry logic circuits of the previously described even module unit. Each of module 1 and 0 adder carry logic circuits operate to detect a plurality of different least significant address bit values as subboundary conditions. In the case of module 1, these values are 111 or 110. For module 0, these values are 111, 110 or 101. The subboundary conditions result from the increased number of interconnections between the gates included in decode circuits of FIG. 4b. In this example, each gate would have 4 inputs. The NAND gate which connects to module 0 would have its inputs connected to decoder outputs 0, 5, 6 and 7 as contrasted with the present embodiment in which the NAND gate inputs connect to decoder outputs 0 and 3. The decoder outputs 5, 6 and 7 define the subboundary address conditions for module 0 in this example in the same manner that decoder output 3 defined the subboundary address condition for the even module as previously described.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory subsystem for use in a system including a processing unit coupled to a multiword bus in common with said subsystem for transfer of information therebetween during bus transfer cycles of operation, said unit being operative to generate memory requests on said bus to said subsystem, each of said requests include a multibit address containing row and column addresses, said memory subsystem comprising:

a plurality of independently addressable memory module units, each memory unit being individually coupled to said multiword bus and having a set of input address lines, said each memory unit including a plurality of rows of random access memory chips and said random access memory chips including a predetermined number of addressable arrays of memory storage devices, said arrays being divided into a predetermined number of rows and columns;

address register means for storing a plurality of least significant address bits of each said address;

first and second multibit tri-state register means coupled to said bus for storing row and column addresses respectively of each said memory request address and said first and second register means being connected in common with said set of lines of said memory module units;

increment circuit means being connected in series with the least significant address lines of said set of address lines of a predetermined one of said memory module units; and logic circuit means coupled to said address register means and to said increment circuit means; said logic circuit means being operative to condition said increment circuit means to modify the portion of said row address applied to said least significant address lines only as a function of the coding of said plurality of least significant address bits enabling simultaneous access to a plurality of sequential storage locations within said predetermined number of said addressable arrays of said memory module units during a single bus cycle of operation.

2. The subsystem of claim 1 wherein said subsystem further includes:

timing means for generating a predetermined sequence of timing signals in response to each memory request, said timing means being coupled to said first and second tri-state register means and to said plurality of memory module units, said first and second tri-state register means being conditioned by one of said sequence of timing signals to apply in succession said row and column addresses to said sets of address input lines, said plurality of memory module units being conditioned by other ones of said timing signals to store in succession said row and column addresses in the rows of random access memory chips of said plurality of memory module units specified by said plurality of least significant address bits enabling said simultaneous access to said plurality of sequential word locations.

3. The subsystem of claim 2 wherein said subsystem further includes a plurality of data registers each coupled to a different one of said memory module units, to said timing means and to said bus, said timing means further including a pair of gating means said pair of gating means being conditioned by another one of said other ones of timing signals to apply signals to said plurality of data registers for enabling the read out of a plurality of sequentially addressed words to said bus during said single bus cycle of operation.

4. The subsystem of claim 3 wherein said subsystem further includes a plurality of multiplexer circuits, said multiplexer circuits being coupled to said plurality of data registers, to a different word section of said bus and to said address register means for receiving signals representative of the least significant address bit and its complement, said plurality of multiplexer circuits being conditioned to apply different ones of said plurality of words from said plurality of data registers to said different word sections of said bus as a function of said coding of said least significant address bit enabling a read operation to start with an odd or even word.

5. The subsystem of claim 2 wherein said subsystem further includes a plurality of data registers, each coupled to a different one of said memory module units;

input multiplexer circuit means coupled to said bus and to said plurality of data registers; and, gating circuit means coupled to said bus and to said input multiplexer circuit means, said gating circuit means in response to each memory request specifying a write operation conditioning said input multiplexer circuit means to transfer the data words of a plurality of data words are received from said processing unit during said single bus cycle of operation into said data registers as a function of the least significant address bit of said memory request address for enabling said write operation to start with an even or odd data word.

6. The subsystem of claim 2 wherein said logic circuit means includes AND gating means having a plurality of inputs and an output connected to said increment circuit means, a number of said plurality of inputs being connected to receive said number of least significant address bits from said address register means and another one of said inputs being connected to said timing means for receiving another one of said timing signals for enabling said AND gating means to generate an output signal in response to said coding of said number of least significant address bits only during the time that said row address is applied to said sets of address input lines.

7. The subsystem of claim 6 wherein said increment circuit means includes an input terminal coupled to said output of said AND gating means, said increment circuit means being operative in response to each said output signal to increment by one said row address signals applied to said least significant address lines.

8. The subsystem of claim 6 wherein said number of said least significant address bits is two, said least significant address bits when said coding is a predetermined value indicating a subboundary address condition occurring during the addressing of said sequential word storage locations and said AND gating means being operative in response to each said predetermined value to generate said output signal for incrementing said least significant row address bits for addressing a next sequential word location.

9. The subsystem of claim 8 wherein said predetermined value corresponds to "11".

10. The subsystem of claim 8 wherein said AND gating means in response to said least significant address bits when said coding has values from 00 through 10, being inhibited from generating said output signal and said increment circuit means in the absence of said output signal being inhibited from incrementing said number of least significant row address bits so that the same row and column addresses are applied to said sets of address lines of said memory module units for accessing a pair of sequential word storage locations within said number of addressable arrays.

11. The subsystem of claim 8 wherein said first and second tri-state register means, each include the same predetermined number of stages and wherein said increment circuit means includes n number of input terminals, connected in common with said n number of stages of said first and second tri-state register means which store a least significant address portion of said row and column addresses, said increment circuit means being operative to increment by one said n number of least significant row address bits in response to each occurrence of said subboundary address condition until said increment circuit means generates an output address sum representative of an actual boundary address condition.

12. The subsystem of claim 11 wherein said actual boundary address condition corresponds to a value which is $2^n$ times the frequency of occurrence of said subboundary address condition and wherein n is selected to have a value which extends said boundary address condition so as not to affect the performance of said memory subsystem.

13. The subsystem of claim 12 wherein said frequency of occurrence of said subboundary address condition is specified by the value "11" of said least significant address bits.

14. The subsystem of claim 13 wherein n is 4 and said boundary address condition occurs in response to memory request addresses having values which are multiples of a predetermined value indicative of the number of sequential word locations which can be accessed in pairs during single cycles of operation.

15. The subsystem of claim 14 wherein said predetermined number has a value which is a multiple of 63 which extends said boundary address condition so as to permit the access of up to 64 sequential word locations.

16. The subsystem of claim 11 wherein said subsystem further includes boundary circuit means coupled to receive predetermined address bits of said memory request address, said boundary circuit means including means for generating an output boundary condition signal indicative of said boundary address condition when said predetermined address bits have a predetermined value corresponding to said address sum.

17. The subsystem of claim 16 wherein said boundary circuit means couples to said timing means and wherein said timing means includes a first pair of gating means coupled to receive signals representative of the least significant address bit and its complement from said address register means, said first pair of gating means logically combining said output boundary condition signals with said least significant address bit and said complement for generating a pair of said sequence of signals, said first pair of gating means being conditioned by said boundary condition signal to generate one of said pair of timing signals specified by the coding of said least significant address bit for storing said row and column addresses in a row of chips of one of said plurality of memory module units enabling access of a first one of said plurality of sequential word locations.

18. A memory subsystem for use in a system including a processing unit coupled to a multiword bus in common with said subsystem for transfer of information therebetween during bus transfer cycles of operation, said unit being operative to generate memory requests on said bus to said subsystem, each of said requests include a multibit adddress coded to specify a storage location with memory subsystem to be accessed, said memory subsystem comprising:

a pair of independently addressable memory module units, each memory unit being individually coupled to said multiword bus and having a set of address input lines, said each memory unit including a plurality of rows of random access memory chips and said random access memory chips including a number of addressable arrays of memory storage devices, said arrays being divided into a number of rows and columns;

addressing means coupled to receive said multibit address of each memory request, said addressing means including:

a multibit address register for storing the least significant address bits of each said memory request address for the duration of processing by said subsystem;

first and second multibit tri-state registers, each having inputs and outputs, said inputs of said first and second registers being coupled to said bus to store row and column address portions respectively of each said memory request address and corresponding ones of said outputs of said first and second registers being connected in common with said sets of address lines;

an adder circuit being connected in series with the least significant address lines of said address input lines of a predetermined one of said memory module units; and logic circuit means coupled to said multibit address register and to said adder circuit, said logic circuit means being operative to condition said adder circuit to increment by one the row address signals applied to said least significant address lines as a function of the coding of said least significant address bits enabling simultaneous access to a pair of words from sequential storage locations within said number of addressable arrays of said memory module units during a single bus cycle of operation.

19. The subsystem of claim 18 wherein said subsystem further includes:

timing means for generating a predetermined sequence of timing signals in response to each memory request, said timing means being coupled to said first and second tri-state registers and to said pair of memory module units, said first and second registers being conditioned by a first one of said sequence of timing signals to apply in succession said row and column addresses to said sets of address input lines, said pair of memory module units being conditioned by other ones of said sequence timing signals to store in succession said row and column addresses in the rows of random access memory chips specified by the coding of said least significant address bits enabling said simultaneous access to said pair of sequential word locations.

20. The subsystem of claim 19 wherein said subsystem further includes a pair of data registers each coupled to a different one of said memory module units, to said timing means and to said bus, said timing means further including a pair of gating means, said pair of gating means being conditioned by another one of said other ones of timing signals to apply signals to said pair of data registers for enabling the read out of said pair of sequentially addressed words to said bus during said single bus cycle of operation.

21. The subsystem of claim 20 wherein said subsystem further includes a pair of multiplexer circuits, said multiplexer circuits being coupled to said pair of data registers, to a different word section of said bus and to said address register means for receiving signals representative of the least significant address bit and its complement, said pair of multiplexer circuits being conditioned to apply different ones of said pair of words from said pair of data registers to said different word sections of said bus as a function of said coding of said least significant address bit enabling a read operation to start with an odd or even word.

22. The subsystem of claim 18 wherein said subsystem further includes a pair of data registers, each coupled to a different one of said memory module units;

input multiplexer circuit means coupled to said bus and to said pair of data registers; and, gating circuit means coupled to said bus and to said input multiplexer circuit means, said gating circuit means in response to each memory request specifying a write operation conditioning said input multiplexer circuit means to transfer the data words of a pair of data words received from said processing unit during said single bus cycle of operation into said data registers as a function of the least significant address bit of said memory request address for enabling said write operation to start with an even or odd data word.

23. The subsystem of claim 19 wherein said logic circuit means includes an AND gate having a plurality of inputs and an output connected to said adder circuit, a number of said plurality of inputs being connected to receive said number of least significant address bits from said address register and another one of said inputs being connected to said timing means for receiving another one of said timing signals for enabling said AND gate to generate an output signal in response to said coding of said number of least significant address bits only during the time that said row address is applied to said sets of address input lines.

24. The subsystem of claim 23 wherein said adder circuit includes a carry input terminal coupled to said output of said AND gate, said adder circuit being operative in response to each said output signal to increment by one said row address signals applied to said least significant address lines.

25. The subsystem of claim 23 wherein said number of said least significant address bits is two, said least significant address bits when coded to have a predetermined value indicating an occurrence of a subboundary address condition during the addressing of said sequential word storage locations and said AND gate being operative in response to each said predetermined value to generate said output signal for incrementing by one said least significant row address bits for addressing a next sequential word location.

26. The subsystem of claim 25 wherein said first and second tri-state registers, each include the same predetermined number of stages and wherein said adder circuit includes first and second sets of operand input terminals, each set including n number of input terminals, said first set of input terminals connected in common with said n number of stages of said first and second tri-state registers which store a least significant address portion of said row and column addresses and said second set of input terminals being connected to receive an all zero operand, said adder circuit being operative to increment said n number of least significant row address bits in response to each occurrence of said subboundary address condition until said adder circuit means generates an output address sum representative of an actual boundary address condition.

27. The subsystem of claim 26 wherein said actual boundary address condition corresponds to a value which is $2^n$ times the frequency of occurrence of said subboundary address condition and wherein n is selected to have a value which extends said boundary address condition so as not to affect the performance of said memory subsystem.

28. The subsystem of claim 26 wherein said subsystem further includes boundary circuit means coupled to receive predetermined address bits of said memory request address, said boundary circuit means including means for generating an output boundary condition signal indicative of said boundary address condition when said predetermined address bits have a predetermined value.

29. The subsystem of claim 28 wherein said boundary circuit means coupled to said timing means and wherein said timing means includes a pair of gating means coupled to receive signals representative of said least significant address bit and its complement from said address register, said pair of gating means logically combining said output boundary condition signal with said least significant address bit and said complement for generating a pair of said other timing signals, said pair of gating means being conditioned by said boundary condition signal to generate one of said pair of timing signals specified by the coding of said least significant address bit for storing said row and column addresses in a row of chips of one of said pair of memory module units enabling access to a first one of said pair of sequential word locations.

30. A memory subsystem for use in a system including a processing unit coupled to a multiword bus in common with said subsystem for transfer of data words therebetween during bus cycles of operation, said unit being operative to generate memory requests on said bus to said subsystem, each of said requests including a multibit address having row and column addresses coded to specify a storage location within said memory subsystem to be accessed, said subsystem comprising:

a plurality of independently addressable memory module units, each memory unit being individually coupled to a different word section of said multiword bus and having a set of address input lines, said each memory unit including a plurality of rows of random access memory chips for providing storage of data words, one module unit including the even numbered rows containing storage locations having even addresses and the other module unit including the odd numbered rows containing storage locations having odd addresses, said random access memory chips including a number of addressable arrays of memory storage devices, said arrays being divided into a number of rows and columns;

an address register for storing a plurality of least significant address bits of each said memory request address;

first and second multibit tri-state address registers each having inputs and outputs, a number of said inputs of said registers being coupled to said bus for storing said row and column addresses respectively and corresponding ones of said outputs of said first and second registers being connected in common with said sets of address lines;

an adder circuit being connected in series with the least significant address lines of said address input lines of said memory module unit containing data words having said even addresses;

timing means for generating a predetermined sequence of timing signals in response to each said memory request, said timing means being coupled to predetermined inputs of said first and second tri-state registers, said first and second tri-state registers being conditioned by a first one of said sequence of timing signals applied to said predetermined inputs to apply in succession said row and column addresses to said outputs and said plurality of memory module units being conditioned by a plurality of row address strobe timing signals and a column address strobe timing signal of said sequence to store said row and column addresses in succession in even and odd rows of said random access memory chips specified by said least significant address bits; and, logic circuit means coupled to said multibit address register, to said adder circuit and to said timing means, said logic circuit means being operative in response to another one of said sequence of timing signals to condition said adder circuit to increment by one, the row address applied to said least significant address lines as a function of the coding of said least significant address bits enabling simultaneous access to a plurality of even and odd sequential word locations within said number of said addressable arrays of said memory module units during a single bus cycle of operation.

31. The subsystem of claim 30 wherein said subsystem further includes a plurality of data registers each coupled to a different one of said memory module units, to said timing means and to said bus, said timing means further including a pair of gating means, said pair of gating means being conditioned by a different one of said other ones of timing signals to apply signals to said plurality of data registers for enabling the read out of a plurality of sequentially addressed words to said bus during said single bus cycle of operation.

32. The subsystem of claim 31 wherein said subsystem further includes a plurality of multiplexer circuits, said multiplexer circuits being coupled to said plurality of data registers, to a different word section of said bus and to said address register means for receiving signals representative of the least significant address bit and its complement, said plurality of multiplexer circuits being conditioned to apply different ones of said plurality of words from said plurality of data registers to said different word sections of said bus as a function of said coding of said least significant address bit enabling a read operation to start with any odd or even word.

33. The subsystem of claim 30 wherein said subsystem further includes a plurality of data registers, each coupled to a different one of said memory module units;
input multiplexer circuit means coupled to said bus and to said plurality of data registers; and,
gating circuit means coupled to said bus and to said input multiplexer circuit means, said gating circuit means in response to each memory request specifying a write operation conditioning said input multiplexer circuit means to transfer the data words of a plurality of data words received from said processing unit during said single bus cycle of operation into said data registers as a function of the least significant address bit of said memory request address for enabling said write operation to start with any even or odd data word.

34. The subsystem of claim 30 wherein said logic circuit means includes an AND gate having a plurality of inputs and an output connected to said adder circuit, a number of said plurality of inputs being connected to receive said number of least significant address bits from said address register and another one of said inputs being connected to said timing means for receiving another one of said timing signals for enabling said AND gate to generate an output signal in response to said number of least significant address bits only when said first address register is conditioned by said timing means to apply said row address to said outputs.

35. The subsystem of claim 34 wherein said adder circuit includes a carry input terminal coupled to said output of said AND gate, said adder circuit being operative in response to each said output signal to increment by one said row address applied to said least significant address lines.

36. The subsystem of claim 34 wherein said number of said least significant address bits is two, said least significant address bits when coded to have a predetermined value indicating an occurrence of a subboundary address condition during the addressing of said sequential word storage locations and said AND gate being operative in response to each said predetermined value to generate said output signal for conditioning said adder circuit to increment by one said least significant row address bits for addressing a second sequential word location of said pair.

37. The subsystem of claim 36 wherein said first and second multibit tri-state address registers, each include the same predetermined number of stages and wherein said adder circuit means includes first and second sets of operand input terminals, each set including n number of input terminals, said first set of input terminals connected in common with said n number of stages of said first and second registers which store a least significant address portion of said row and column addresses and said second set of input terminals being connected to receive an all zero operand signals, said adder circuit being operative to increment said n number of least significant row address bits in response to each occurrence of said subboundary address condition until said adder circuit generates an output address sum representative of an actual boundary address condition.

38. The subsystem of claim 37 wherein said boundary address condition corresponds to a value which is $2^n$ times the frequence of occurrence of said subboundary address condition and wherein n is selected to extend the boundary address condition so as not to affect the performance of said memory subsystem.

39. The subsystem of claim 37 wherein said subsystem further includes boundary circuit means coupled to receive predetermined address bits of said memory request address, said boundary circuit means including decoder means for generating an output boundary condition signal indicative of said boundary address condition when said predetermined address bits have a predetermined value.

40. The subsystem of claim 39 wherein said boundary circuit means coupled to said timing means and wherein said timing means includes a pair of gating means coupled to receive signals representative of said least significant address bit and its complement from said address register, said pair of gating means logically combining said output boundary condition signal with said least significant address bit and said complement for generating said pair of row address strobe timing signals, said pair of gating means being conditioned by said boundary condition signal to generate one of said pair of row address strobe timing signals specified by the coding of said least significant address bit for storing said row and column addresses in a row of chips of one of said pair of memory module units enabling access to a first one of said pair of sequential word locations.

41. A memory subsystem for use in a system including a processing unit coupled to a multiword bus in common with said subsystem for transfer of data words therebetween during bus cycles of operation, said unit being operative to generate memory requests on said bus to said subsystem, each of said requests including a multibit address having row and column addresses coded to specify a storage location within said memory subsystem to be accessed, said subsystem comprising:

N number of independently addressable memory module units, each memory unit being individually coupled to a different word section of said multiword bus and having a set of address input lines, said each memory unit including a plurality of rows of random access memory chips for providing storage of data words, N/2 module units including the even numbered rows containing storage locations having even addresses and N/2 module units including the odd addresses, said random access memory chips including a number of addressable arrays of memory storage devices, said arrays being divided into a number of rows and columns;

an address register for storing a plurality of least significant address bits of each said memory request address;

first and second multibit tri-state address registers each having inputs and outputs, a number of said inputs of said registers being coupled to said bus for storing said row and column addresses respectively and corresponding ones of said outputs of said first and second registers being connected in common with said sets of address lines;

N−1 number of adder circuits being connected in series with the least significant address lines of said address input lines of said N/2 memory module units contining data words having said even addresses and (N/2)−1 memory module units containing data words having said odd addresses; and, N−1 number of logic circuit means, each logic circuit means being coupled to said multibit address register and to a corresponding one of said N−1 adder circuits, said N−1 logic circuit means being operative to condition said adder circuits to increment by one, the portion of said row address applied to said least significant address lines as a function of the coding of said plurality of least significant address bits enabling simultaneous access to a plurality of even and odd sequential word locations within said number of said addressable arrays of said memory module units during a single bus cycle of operation.

* * * * *